T. ERICKSON.
HOOF TRIMMER.
APPLICATION FILED JULY 24, 1916.
1,229,732.
Patented June 12, 1917.
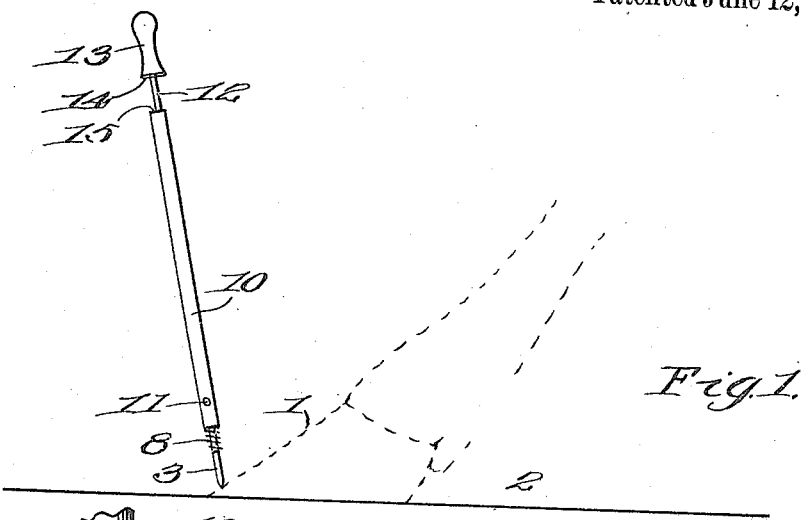
Fig. 1.
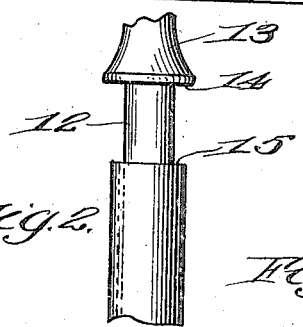
Fig. 2.
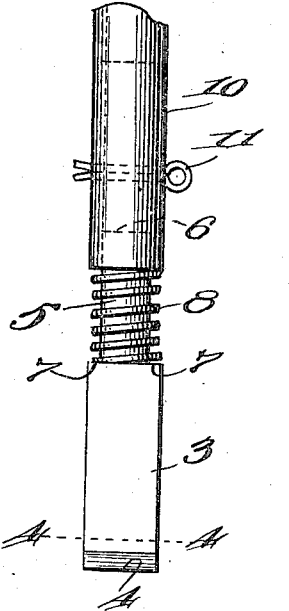
Fig. 3.
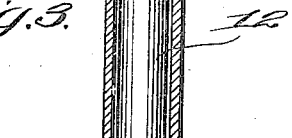
Fig. 4.
Fig. 5.
Inventor:—
Thomas Erickson
by Carl M Crawford
Atty

UNITED STATES PATENT OFFICE.

THOMAS ERICKSON, OF REARDON, WASHINGTON.

HOOF-TRIMMER.

1,229,732.  Specification of Letters Patent.  Patented June 12, 1917.

Application filed July 24, 1916. Serial No. 111,096.

*To all whom it may concern:*

Be it known that I, THOMAS ERICKSON, a citizen of the United States, residing at Reardon, in the county of Lincoln and State of Washington, have invented new and useful Improvements in Hoof-Trimmers, of which the following is a specification.

This invention relates to improvements in hoof trimmers.

The invention has to do more particularly with a hoof trimmer which is especially adapted for horses. When a horse goes unshod for a considerable time, the hoof grows and spreads considerably beyond the normal size of the hoof and therefore it is customary to trim off the margin to get the hoof down to a normal size. Heretofore, it has been customary to lift the horse's foot and hold it between the legs of the operator while a pair of trimming nippers or pliers have been applied to the hoof margin to trim the same. By lifting the horse's hoof and attempting to hold it between the legs, the operator is often subjected to injury by nervous or vicious horses because of the fact that the operator is at a position of distinct disadvantage favorable to the horse. Now it is one of the principal objects of my invention to provide a trimmer which can be operated in such a manner that the operator cannot be kicked by the horse. Furthermore, it is a feature of my invention to provide a device whereby the hoof may be trimmed without lifting the hoof from the floor.

My invention includes a hoof trimming member which is adapted to be applied to the margin of a hoof to be trimmed, yieldingly acting hand grip means being operatively connected with the hoof trimmed to impinge the same upon the hoof in a set position, and a hammer adapted for impact upon the trimming member to sever the margins which it is desired to trim off.

Other objects and features of my invention will be more fully described in the accompanying drawing and will be more particularly pointed out in and by the appended claim.

In the drawing:—

Figure 1 is a view in elevation showing the applicability of my device.

Fig. 2 is an enlarged view contracted and illustrating the trimming member in side elevation.

Fig. 3 is a longitudinal vertical sectional view with the trimming member in edge elevation.

Fig. 4 is a sectional view on line 4—4 of Fig. 2.

Fig. 5 is a sectional view of a modified form of trimming member

Like characters of reference designate similar parts throughout the different figures of the drawing.

In Fig. 1 of the drawing I have shown the hind hoof of a horse in dotted lines, as indicated at 1, the same resting upon the floor, as indicated by floor line 2. This is the position which the hoof would occupy when the device of my invention is applied thereto for operation. Thus it will be seen that instead of having to stand behind that horse, the operator stands in front, or at least laterally of the hoof to be trimmed, so that it is practically impossible for the operator to be kicked.

My improved trimmer comprises a trimming member which in the present and preferred form consists of a blade 3, slightly transversely curved as indicated in Fig. 4, and provided with a sharp chisel-like edge 4. The curvature shown is very slight but is sufficient to conform to the general curvature of the hoof so that the margin of the latter may be trimmed off on a continuously curved line. The trimming member shown is provided with a shank 5 having a slot 6 intermediate its ends. The shank 5 is cylindrical but is somewhat reduced with respect to the graded cross section of the blade 3 thereby providing shoulders 7 adapted to form abutment for spring 8. The upper end of shank 5, as indicated at 9, forms a hammer impact surface.

My invention includes a hand grip which is preferably in the form of a sleeve 10 of such size as to telescope the shank 5. The spring 8 is interposed between the hand grip 10 and the shoulders 7, preferably surrounding the shank 5, in such a manner that after the trimming member has been disposed in the desired position upon the hoof as shown in Fig. 1, the hand grip 10 can be forced downwardly against the action of the spring to yieldingly impinge the trimmer 3 upon the hoof in the initial set position. Said hand grip or sleeve 10 has a loose connection with the trimming member which is preferably formed by the slot 6 in the shank 5 and a cotter pin 11 or like pin connection extending through the sleeve 10 and through the slot 6. The spring 8 normally holds the hand grip and the trimming member in separated relation as shown in Figs. 2 and 3.

A hammer is provided which may consist of a hammer rod 12 telescoping hand grip sleeve 10 in a manner to impact against the top 9 of shank 5. Said hammer rod 12 is provided with a handle 13 adapted to be grasped by the operator and the relative lengths of the hammer rod 12 and hand grip sleeve 10 are such that when the hammer rod is in engagement with the shank 5, the shoulder 14 of the handle will be somewhat remote from the upper end 15 of the sleeve 10.

In operation, the implement will be disposed in the position shown in Fig. 1 inside of the edge sufficiently to determine the margin of the hoof to be trimmed off. In order to prevent the trimming member 3 from slipping down on the hoof and cutting off or trimming a margin of lesser width, the operator will press down or thrust sleeve 10 downwardly against the action of spring 8, whereupon the trimming member will be securely impinged upon the hoof. Then the operator will grasp the handle 13, with the remaining hand, driving the hammer rod 12 successively downwardly upon the end 9 of the shank 5 in order to force trimming member 3 through the hoof portion to be trimmed off. Because of the fact that the horse's hoof rests upon the floor, the horse will feel little or no shock as a result of this trimming operation and in practice it has been found that after the horse hears the impact of the hammer once or twice, he pays no attention to the further operation. A great feature of this invention resides in the fact that all of the horse's hoofs remain upon the floor and therefore the horse assumes a natural and comfortable position and it is partly because of this fact the horse, even if nervous or vicious, does not object to the trimming operation and in the great majority of cases is willing to stand perfectly still.

The hoof of a horse is of a somewhat tough and tenacious material and it is well known that it does not come off in short strips when a sharpened implement is applied thereto. Usually, it comes off in long strips, the strips remaining intact from the start to the completion of the operation around the hoof. Thus with my invention, if I provide a relatively wide trimming member, I can trim a hoof in much less time than is required by the pliers or pinchers now employed. Furthermore, by the device of my invention, the trimmed off strip of the hoof is not torn off because it is not necessary to oscillate the implement in the trimming operation, as it is with pliers. Thus the edge of the hoof is truer and more trim after the device of my invention has been applied thereto than would be the case if pliers were used, as the pliers do not actually cut the margin off from the hoof but the pliers are oscillated after they grip the hoof to partially cut and partially tear the trimmed portion off from the hoof.

In Fig. 5, I have shown a trimming member which is flat instead of curved, as shown in Fig. 4, this form of trimming member being cheaper to make and easier to sharpen but not being considered quite as efficient as the form shown in Fig. 4 which is slightly curved. However I do not confine myself to any particular form of trimming member.

It is believed that the advantages and utility of my invention will be clearly understood from the foregoing description and while I have herein shown and described specific forms of my invention, I do not wish to be limited thereto except for such limitations as the claim may import.

I claim:—

In a trimming tool of the class described, the combination with a sleeve having open tool and handle ends and said sleeve having a uniform internal diameter, of a trimming tool having a shank longitudinally slidable into the tool end of said sleeve, means loosely connecting said shank with said sleeve and positively limiting projection of the shank outwardly and inwardly of said sleeve beyond predetermined points, a spring interposed between the tool end of said sleeve and said tool and normally acting to project said tool from said sleeve to the outward limit permitted by said means thereby affording play for slight movement of said sleeve toward said tool in opposition to the said spring to impinge the tool tightly against the part to be trimmed, and a hammer rod slidable into the handle end of said sleeve for direct impact upon the end of the shank wholly independently of said spring, said hammer rod having a handle for manual reciprocation of said hammer rod and said rod being of sufficient length to dispose said handle beyond engagement with the handle end of said sleeve when said rod impacts against said shank whereby the full force of a blow by said rod will be imparted to said shank independently of said sleeve, substantially as described.

In testimony, that I claim the foregoing as my own, I hereby affix my signature.

THOMAS ERICKSON.